United States Patent
Hayashi et al.

[11] Patent Number: 5,474,747
[45] Date of Patent: Dec. 12, 1995

[54] GAS PURIFIER USING PLASMA AND CATALYST

[75] Inventors: Yuji Hayashi; Noboru Wakatsuki, both of Kawasaki, Japan

[73] Assignee: Fujitsu Ltd., Kawasaki, Japan

[21] Appl. No.: 139,907

[22] Filed: Oct. 22, 1993

[30] Foreign Application Priority Data

Nov. 27, 1992 [JP] Japan .................................. 4-318557
Jan. 13, 1993 [JP] Japan .................................. 5-004248
Apr. 7, 1993 [JP] Japan .................................. 5-080745

[51] Int. Cl.⁶ .................... B01D 53/94; B01D 53/56; B01D 53/73
[52] U.S. Cl. .................. 422/177; 60/275; 60/301; 422/168; 422/169; 422/180
[58] Field of Search .................. 422/168, 169, 422/170, 174, 177, 180; 60/275, 299, 301

[56] References Cited

U.S. PATENT DOCUMENTS

| | | | |
|---|---|---|---|
| 3,959,661 | 5/1976 | Sander | 422/186.12 |
| 3,966,443 | 6/1976 | Okano et al. | 55/337 |
| 3,983,021 | 9/1976 | Henis | 204/164 |
| 3,994,790 | 11/1976 | Inoue | 204/130 |
| 4,542,010 | 9/1985 | Roman et al. | 422/177 X |
| 4,780,277 | 10/1988 | Tanaka et al. | 422/4 |
| 4,901,669 | 2/1990 | Yamamoto et al. | 118/723 |
| 4,905,470 | 3/1990 | Reichle et al. | 422/169 X |
| 4,954,320 | 9/1990 | Birmingham et al. | 422/184 X |
| 5,026,470 | 6/1991 | Bonyhard et al. | 204/298.16 |
| 5,033,264 | 7/1991 | Cabral | 60/274 |
| 5,130,007 | 7/1992 | Ooe et al. | 204/270 |

FOREIGN PATENT DOCUMENTS 62-033527 2/1987 Japan.
63-242323 10/1988 Japan.

*Primary Examiner*—Robert J. Warden
*Assistant Examiner*—Robert Carpenter
*Attorney, Agent, or Firm*—Staas & Halsey

[57] ABSTRACT

A gas purifier comprising a casing, and two magnetically sensitive reeds arranged in the casing so that one reed extends from one end wall of the casing and the other reed extends from the other end wall of the casing and the free ends of the reeds overlap one above another with a small gap therebetween to form opposing contacts. The magnetically sensitive reeds are magnetically moved by a driving coil so that the contacts are opened and closed like a switch. This operation of the contacts and the contact load coil induces a glow discharge by which a gas is purified by an action of the plasma. A catalyst is carried by the contacts or the casing. Therefore, gas is purified synergically by the action of the plasma and the action of the catalyst. It is also possible to operate the magnetically sensitive reeds, or the like electrodes, by an AC voltage to induce a glow discharge.

10 Claims, 20 Drawing Sheets

GAS PURIFIER USING PLASMA AND CATALYST

BACKGROUND OF THE INVENTION

1. Field of the Invention

The present invention relates to a gas purifier for air pollution control. More particularly, the present invention relates to a gas purifier utilizing the action of a catalyst and the action of a plasma.

2. Description of the Related Art

Air pollution control is a critical social problem. Polluting gases, including toxic components such as COx, CmHn, NOx, and SOx, are exhausted in large quantities from factories and automobiles, and it is important to purify such polluting gases. Also, in a space station, it is necessary to purify a specific gas such as methyl gas.

For air pollution control, large scale gas purifiers such as a centrifugal purifier, a discharge purifier, a desulfurizer, and others are installed in a factory. An exhaust emission control device using a catalyst is mounted in an automobile. These conventional gas purifiers purify gases on the basis of single physical or chemical action, and thus have a limited purification efficiency.

Japanese Unexamined Patent Publication (Kokai) No. 62-33527 discloses a gas purifier comprises a discharge area and a catalytic reaction area located downstream of the discharge area. According to the method described in this publication, exhaust gas is first routed to the discharge area and is ionized to a plasma gas. The plasma gas is then routed to the downstream catalytic reaction area. Also, Japanese Unexamined Patent Publication (Kokai) No. 63-242323 discloses a gas purifier in which gas is treated by a discharge, and the gas is then passed through catalysts.

In the above described Japanese Unexamined Patent Publication No. 62-33527, the discharge area includes needle electrodes to which a voltage of several thousand volts to several tens of thousands volts is applied. In the Japanese Unexamined Patent Publication No. 63-242323, mesh electrodes or bar electrodes and a high voltage generator are used. In this manner, the conventional gas purifier combines the action of a plasma and the action of a catalyst, but needs a high voltage power source to generate a plasma.

In addition, the discharge area and catalytic reaction area are provided as separate stages, and a problem arises that the gas becomes plasma containing gas in the discharge area, but the content of plasma in the gas decreases before the gas reaches the next catalytic reaction area, and the combined effect of an action of plasma and an action of catalyst is not as high as expected.

SUMMARY OF THE INVENTION

The object of the present invention is to provide a gas purifier which is relatively compact, which can induce a glow discharge with the application of relatively low voltage, and by which the action of the plasma and the action of the catalyst can be synergically combined.

According to the present invention, there is provided a gas purifier comprising a casing having at least two openings allowing gas to flow through the casing, at least one pair of magnetically sensitive reeds arranged in the casing and having opposing contacts, a driving coil for opening and closing the contacts of the at least one pair of reeds, a contact load coil connected to the at least one pair of reeds, and a catalyst arranged at least in the vicinity of the contacts of the at least one pair of reeds.

In the aforesaid arrangement, a glow discharge occurs at the contacts of at least one pair of reeds are opened during the opening and closing operations of the contacts, and polluting gases such as COx, CmHn, and NOx are decomposed into element molecules or molecules of harmless gases by the action of the plasma resulting from the glow discharge. In addition, the catalyst carried on the contacts of the reeds or arranged in the vicinity of the contacts of the reeds further decomposes the polluting gases into element molecules or molecules of harmless gases. These gas purification methods provide a synergic effect and excellent gas purification is obtained.

Another feature of the present invention is that a gas purifier composes a casing having at least two openings allowing gas to flow through the casing, at least one pair of opposing electrodes arranged in the casing, an AC power supply for inducing glow discharge on the at least one pair of electrodes, and a catalyst carried by the at least one pair of electrodes.

In the foregoing arrangement, if the at least one pair of electrodes are arranged in a similar manner to the aforesaid magnetically sensitive reeds having opposing contacts, a glow discharge occurs when the contacts are opened during the opening and closing operation of the contacts as mentioned above. Therefore, in this case too, gas purification is obtained from the synergic combination of the action of the plasma and the action of the catalyst. Further, in this case, the glow is substantially continuously produced by an AC power supply, preferably a high frequency AC power supply. Herein, the electrodes are not limited to the aforesaid magnetically sensitive reeds but may comprise wide electrode films having a catalytic metal formed on an insulating layer by vapor depositing or sputtering.

BRIEF DESCRIPTION OF THE DRAWINGS

The present invention will become more apparent from the following description of the preferred embodiments, with reference to the accompanying drawings, in which.

DESCRIPTION OF PREFERRED EMBODIMENTS

Figure 1:
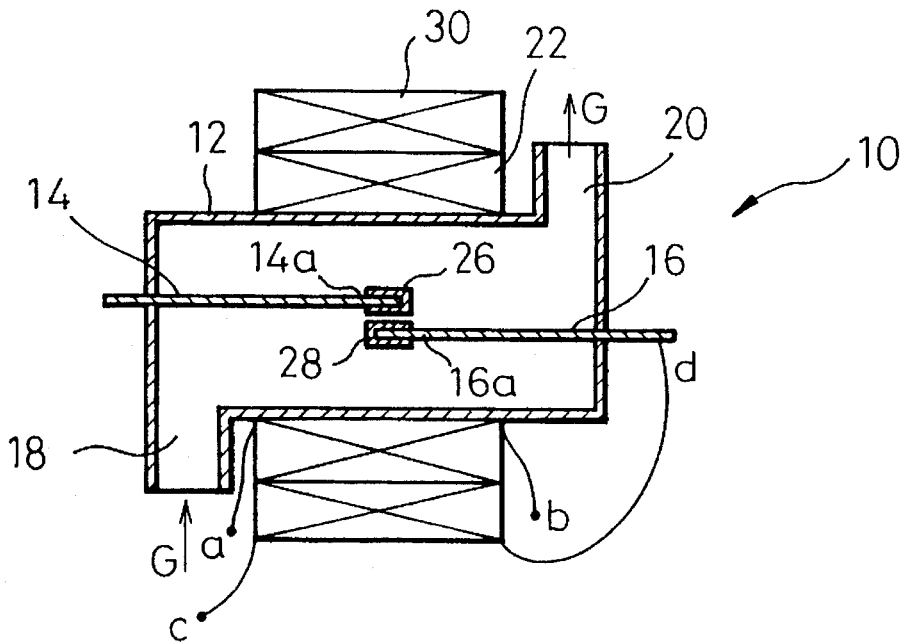
FIG. 1 is a cross-sectional view illustrating the first embodiment of the present invention.

FIG. 1 shows a gas purifier according to the first embodiment of the present invention. The gas purifier 10 comprises a casing 12, and a pair of magnetically sensitive reeds 14 and 16 arranged in the casing 12 as electrodes having a respective pair of substantially parallel opposing surfaces. The casing 12 includes two openings 18 and serving as an inlet and an outlet for gas, so that gas flows in a manner, for example, as indicated by the arrow G. In FIG. 1, the opening 18 serves as an inlet for gas and the opening 20 serves as an outlet for gas, but it is not necessary to specify the openings 18 and 20 as the inlet and the outlet for gas. The casing 12 is made from metal or glass which is not corroded by gas to be purified.

The reeds 14 and 16 extend through the casing 12 in opposite directions from the outside of the casing 12 to the inside of the casing 12, and have at the free ends thereof contacts 14a and 16a which are opposed to each other at a small gap therebetween. When the casing 12 is made from metal, an insulating layer (not shown) is placed between the reeds 14 and 16 and the casing 12. These reeds 14 and 16 are made from a magnetically sensitive material such as Permalloy.

Figure 2A:
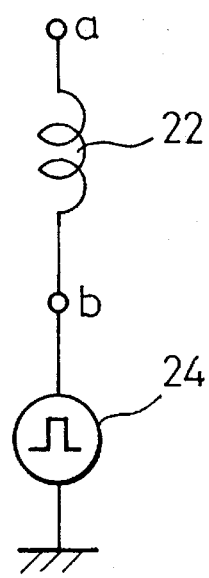
FIGS. 2A and 2B are views illustrating connections of the driving coil and the contact load coil of FIG. 1.

A driving coil 22 is wound around the casing 12. The driving coil 22 has terminals "a" and "b". As shown in FIG. 2A, one terminal "a" of the driving coil 22 is connected, for example, to a power supply of 5 to 12 volts. The other terminal "b" of the driving coil 22 is connected to a pulse generator 24. The pulse generator 24 generates, for example, rectangular pulses. When the pulse generator 24 generates pulses, the driving coil 22 is excited so that the contacts 14a and 16a of the reeds 14 and 16 are closed as magnetic reed switch closes. Therefore, current flows between the reeds 14 and 16. When the pulse generator 24 does not generate pulses, the driving coil 22 is not excited and the contacts 14a and 16a of the reeds 14 and 16 are open. Current is then cut off between the reeds 14 and 16.

The contacts 14a and 16a of the reeds 14 and 16 have catalyst layers 26 and 28 plated thereon. The catalyst layers 26 and 28 are selected from metals having catalysis (for example, 21 kinds of transition d metals; Hf, Ta, Zr, Nb, W, Ti, V, Mn, Cr, Mo, Re, Ni, Co, Tc, Os, Ir, Ru, Pt, Rh, and Pd). Preferably, the catalyst layers 26 and 28 comprise at least one of a precious metal group comprising platinum (Pt), palladium (Pd), rhodium (Rh), and ruthenium (Ru). The reeds 14 and 16 made of Permalloy are plated with gold and the catalyst layer 26 or 28 is then plated on the gold plated reed.

Figure 2B:
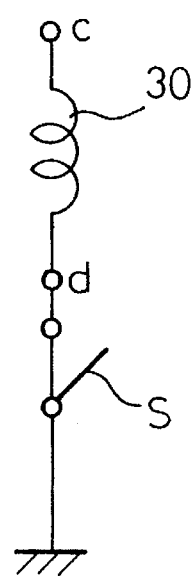

In FIG. 1, a contact load coil 30 is wound around the driving coil 22. As shown in FIG. 2B, one end "c" of the contact load coil 30 is connected to a direct current power supply of, for example, 12 to 24 volts. The other end "d" of the contact load coil 30 is connected to a switch S comprising the contacts 14a and 16a of the reeds 14 and 16. The contact load coil 30 has an inductance L, and thus the reeds 14 and 16 are connected to a circuit having the inductance L.

Figure 3:
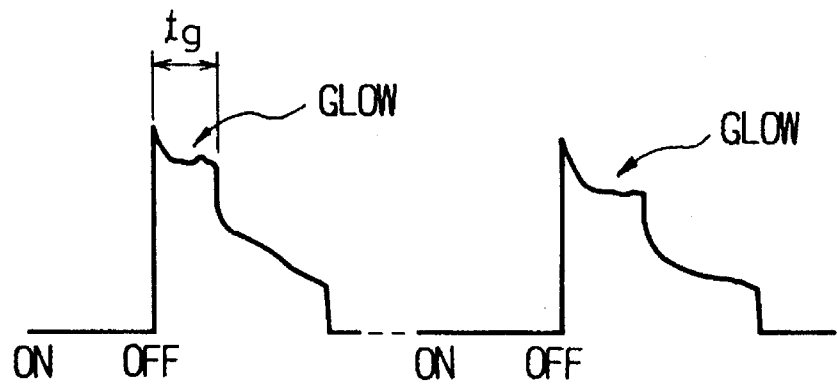
FIG. 3 is a view illustrating discharge occurring when the contacts are opened.

When the contacts 14a and 16a of the reeds 14 and 16 are opened by the turning off of pulses, a back electromotive force "e" ($e = L(di/dt)$) is induced at the contacts 14a and 16a due to the provision of the inductance L. The inventors have found that the presence of the back electromotive force "e" causes glow discharge to occur immediately after the opening the contacts, as shown in FIG. 3. In this case, a glow discharge is developed at a relatively low applied voltage. The inventors have also found that a glow discharge voltage and a glow duration time tg vary depending on the value of the inductance L and the kind of gas in the casing 12. It is therefore preferred that the value of a supply voltage and the value of the inductance L of the contact load coil 30 is determined and a material for the catalytic layers 26 and 28 is selected, depending on the type of gas to be purified.

For example, when gas containing nitrogen component is to be purified, the supply voltage for the contact load coil 30 is 12 V, the inductance L is 1 henry, and rhodium is selected as the material for the catalyst layers 26 and 28. In this case, it is conceived that the following reactions are promoted by the action of the plasma resulting from the glow discharge:

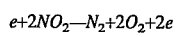

In addition to the foregoing plasma action, a further gas purification action occurs when the gas contacts the catalyst layers 26 and 28 made of, for example, rhodium, in a manner known in a conventional exhaust emission control device for an automobile. These two types of gas purification proceed simultaneously to provide a synergic purification effect, and an excellent gas purification performance is obtained.

Figure 5:
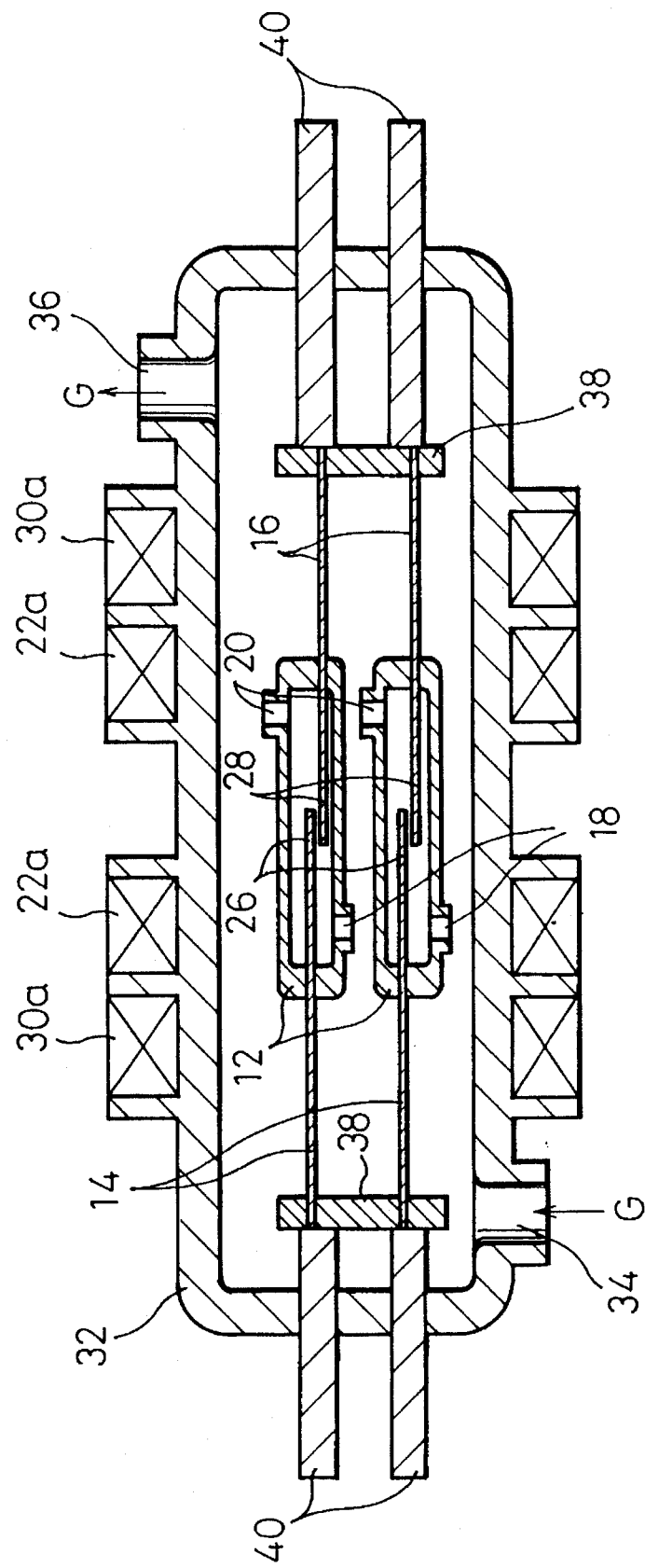
FIG. 5 is a cross-sectional view illustrating the second embodiment of the present invention.
Figure 6:
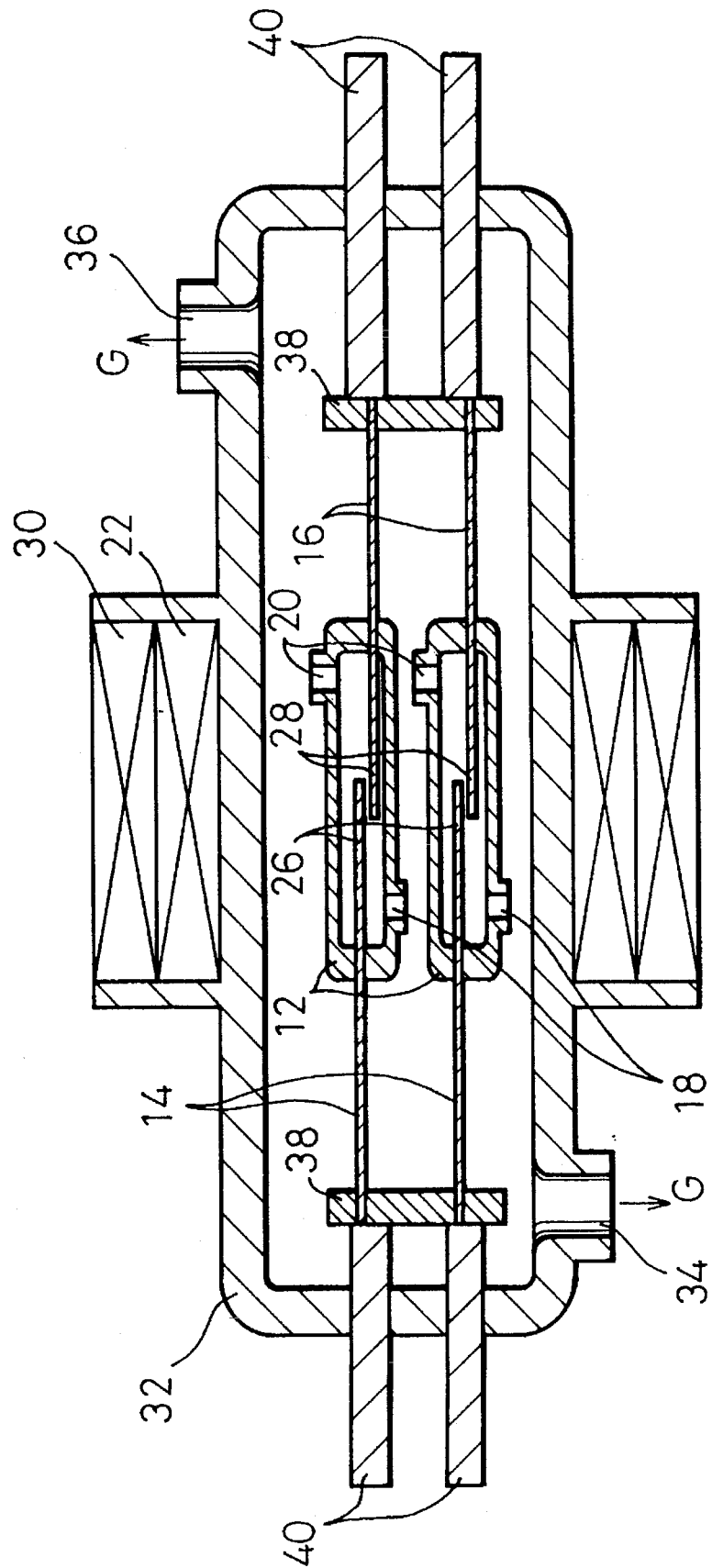
FIG. 6 is a cross-sectional view illustrating the third embodiment of the present invention.

FIGS. 5 and 6 show the second and third embodiments of the present invention, respectively. In FIGS. 5 and 6, two casings 12 each having a pair of reeds 14 and 16, as shown in FIG. 1, are accommodated in an outer housing 32. The outer housing 32 has an inlet 34 and an outlet 36 for gas. Coils similar to the aforesaid driving coil 22 and the contact load coil 30 are wound around the outer housing 32.

In FIG. 5, two pairs of driving coils 22a and contact load coils 30a are arranged side by side on the outer housing 32. There is no coil at the center of the housing 32, and the glow discharge which occurs on the contacts 14a and 16a of the reeds 14 and 16 (especially, on the negative contact) can be seen if the outer housing 32 is made of a glass.

In FIG. 6, the contact load coil 30 is wound around the driving coil 22 in a similar manner to FIG. 1. The other features are identical between the embodiments of FIGS. 5 and 6. The following description will be made with reference to FIG. 5.

In FIG. 5, the reeds 14 and 16 extend through the casings 12 to the inside of the casing 12. A plurality of reeds 14 or 16 extending to the outside of the casings 12 and having the same polarity are attached to a common supporting plate 38 within the outer housing 32. Rod-like terminal members 40 are attached to the common supporting plates 38 and extend through the outer housing 32 to the outside of the outer housing 32. The II shaped assemblies of the terminal members 40 and the common supporting plates 38 mechanically support two casings 12. The common supporting plates 38 are conductive, and the contact load coil 30a is thus connected to the reeds 14 and 16 via the terminal members 40 and the common supporting plates 38. One of each pair of terminal members 40 may be non conductive. It is possible to arrange a single terminal member 40.

In the embodiments of FIGS. 5 and 6, gas purification is obtained, based on an action of plasma and an action of catalyst, similarly to the embodiment of FIG. 1. Since a plurality of casings 12 are installed in the outer housing 32, it is possible not only to design the reeds 14 and 16 so that smooth switching operations are ensured, to induce a glow discharge, but also to be able to treat a large amount of gas.

Figure 4:
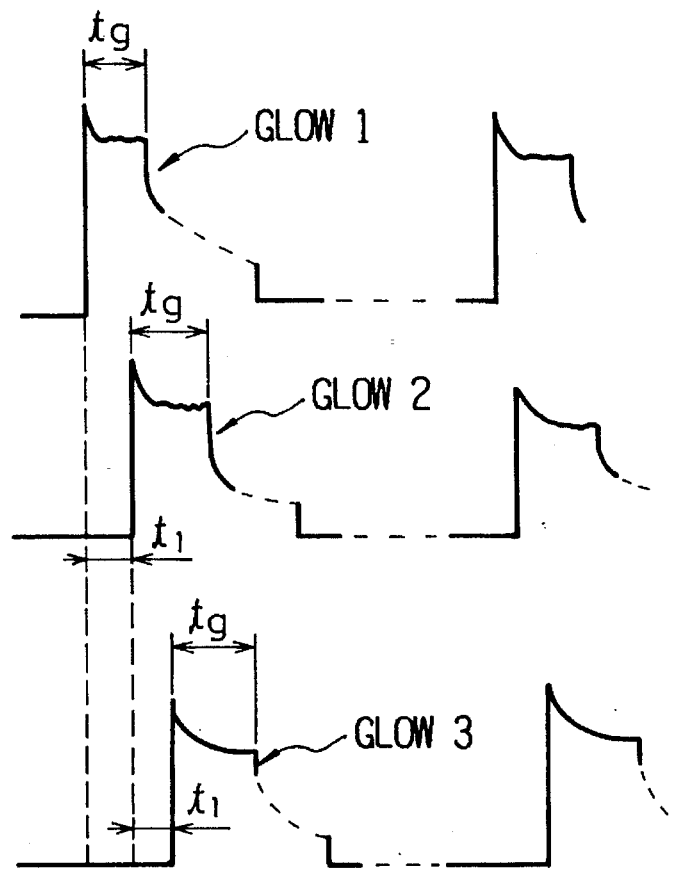
FIG. 4 is a view illustrating cascaded glow discharge.

The glow duration time tg in FIG. 3 is actually very short. Therefore, it is possible to arrange, for example, three pairs of reeds 14 and 16, so that cascaded glow discharges occur between pairs of reeds 14 and 16 with a time lag of $t_1$ (glow 1, glow 2, and glow 3), as shown in FIG. 4. The total glow discharge duration time then becomes longer, and the gas purification efficiency is improved. For this purpose, it is possible to arrange three casings 12 in the outer housing 32 in FIG. 5 and the driving coil 22 is arranged for each casing 12. Alternatively, it is possible to arrange three pairs of reeds 14 and 16 in the casing 1 in FIG. 1 and the pairs of reeds 14 and 16 are then driven with a time lag between pairs of reeds.

Figure 7:
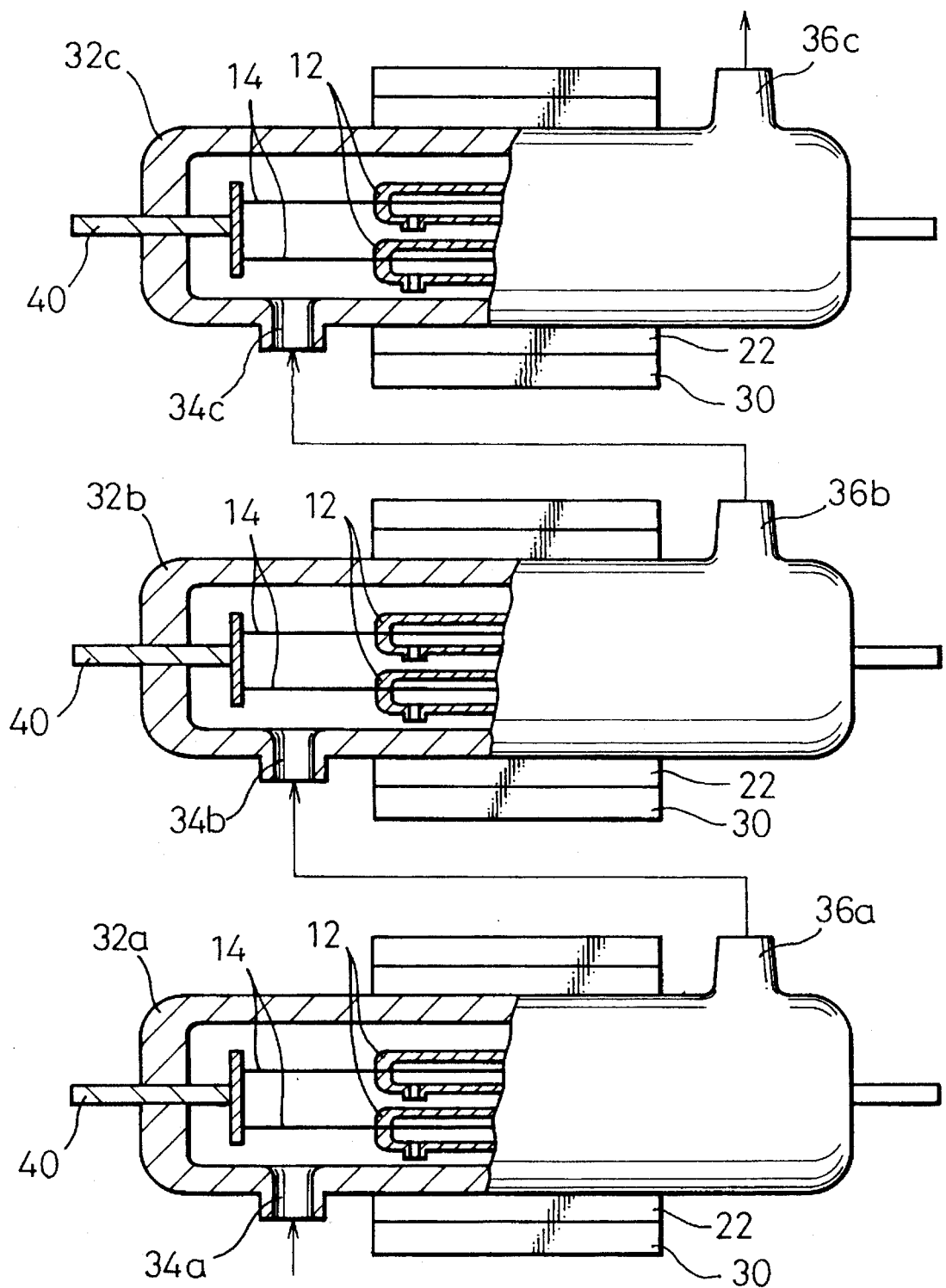
FIG. 7 is a cross-sectional view illustrating the fourth embodiment of the present invention.

FIG. 7 shows the fourth embodiment of the present invention. In this embodiment, three housings 32a, 32b, and 32c accommodating a plurality of casings 12 having reeds 14 and 16, respectively, in a manner shown in FIGS. 5 and 6, are arranged in series. Specifically, in view of the gas flow, the gas outlet 36a of the first outer housing 32a is connected to the gas inlet 34b of the second outer housing 32b, and the gas outlet 36b of the second outer housing 32b is connected to the gas inlet 34c of the third outer housing 32c.

Figure 8A:
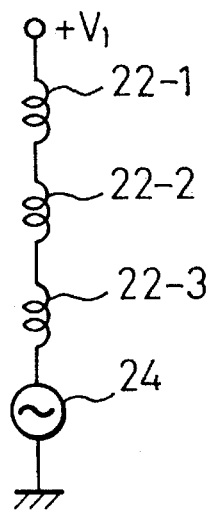
FIGS. 8A and 8B are views illustrating connections of the driving coil and the contact load coil of FIG. 7.
Figure 8B:
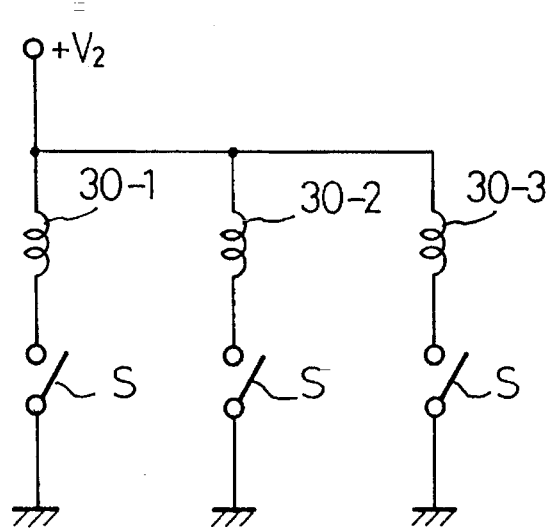

FIGS. 8A and 8B show the connections of the driving coils 22-1, 22-2, and 22-3 and the contact load coils 30-1, 30-2, and 30-3 in the arrangement of FIG. 7. The subscriptions of the numerals 22 and 30 in FIGS. 8A and 8B denote one of three elements in FIG. 7. The driving coils 22-1, 22-2, and 22-3 are connected in series with one another, while the contact load coil coils 30-1, 30-2, and 30-3 are connected in parallel with one another.

In addition, materials of the catalyst layers 26 and 28 of the contacts 14a and 16a of the reeds 14 and 16 are changed among the outer housings 32a, 32b, and 32c. Platinum is used for the first outer housing 32a, rhodium is used for the second outer housing 32b, and palladium is used for the third outer housing 32c. This provides not only the action of the plasma but also the action of the catalyst in the identical manner to a three-way catalyst provided in an automobile. It is also possible to mitigate the poisoning action of rhodium.

Figure 9A:
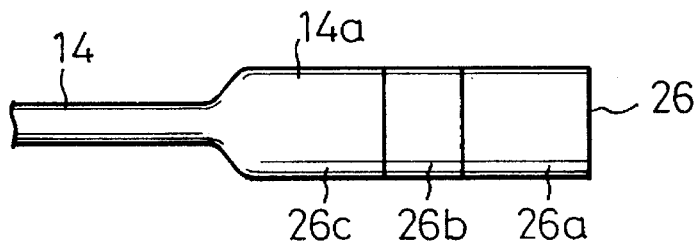
FIG. 9A is a plan view of the contact of the reed according to the fifth embodiment of the present invention.
Figure 9B:
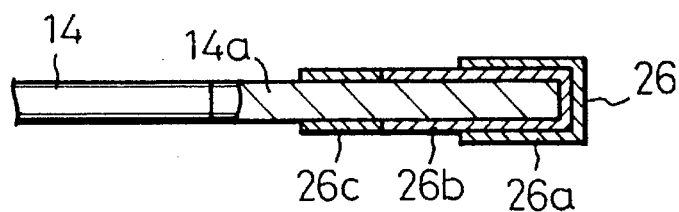
FIG. 9B is a cross-sectional view of the contact of the reed of FIG. 9A.

FIG. 9 shows the fifth embodiment of the present invention. In this embodiment, the catalyst layer 26 or 28 on the contact 14a or 16a of the reed 14 or 16 is composed of a superficial rhodium layer 26a. A platinum or palladium layer 26b that underlies the rhodium layer 26a and is partly exposed by the rhodium layer 26a. The reeds 14 and 16 are made of Permalloy and are plated with gold, and are also plated with the catalytic layers 26a and 26b one above another. Cerium oxide ($CeO_2$) 26c is coated on the contact 14a or 16a adjacent to the catalytic layer 26.

By this arrangement, it is possible to carry out a gas purification based on the action of the plasma and the action of the three-way catalyst.

Figure 10:
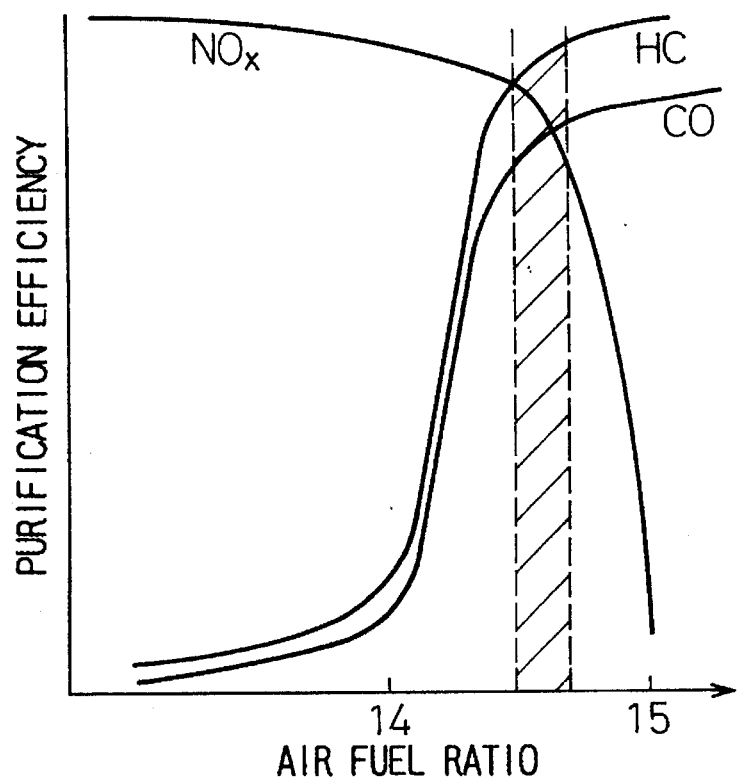
FIG. 10 is a graph showing the exhaust gas purification efficiency relative to the air fuel ratio.

FIG. 10 is an explanatory diagram illustrating the exhaust gas purification efficiency of a three-way catalyst in an automobile. It is known that the three-way catalyst works well in the hatched region in FIG. 10 including an ideal air-fuel ratio (14.7), and becomes less effective when the air fuel ratio is not in this region. The cerium oxide 26c adjacent to the catalyst layer 26 absorbs oxygen if the exhaust gas is rich, and discharges oxygen if the exhaust gas is lean. This property of the cerium oxide will maintain an air-fuel ratio at an ideal value. The features of FIG. 10 is particularly suitable for a purifier for an exhaust system in an automobile.

Figure 11:
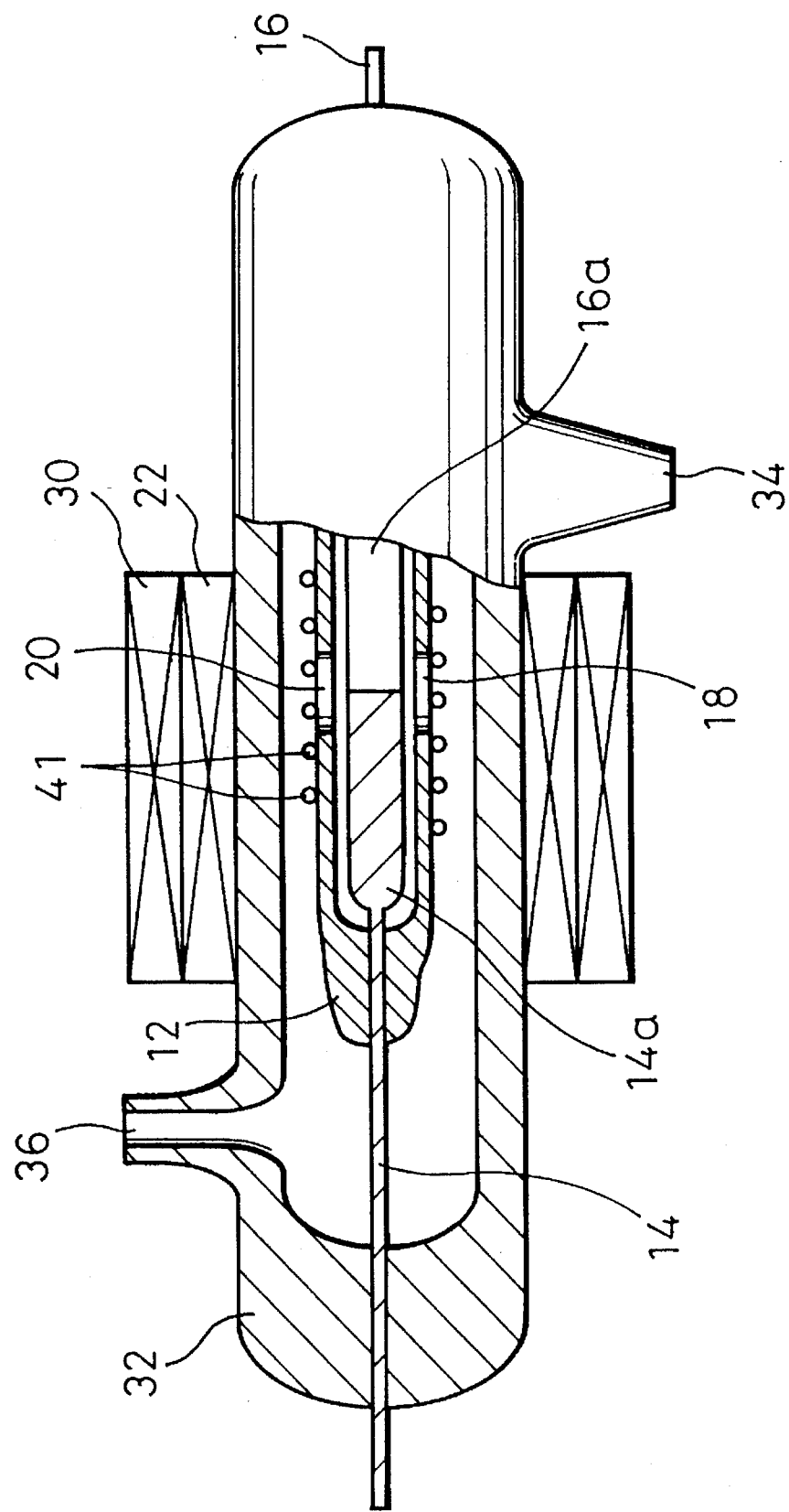
FIG. 11 is a cross-sectional view illustrating the sixth embodiment of the present invention.

FIG. 11 shows the sixth embodiment of the present invention. In this embodiment, similarly to the embodiment of FIG. 5, the casing 12 having reeds 14 and 16 is accommodated in the outer housing 32. The casing 12 has openings 18 and 20 in the vicinity of the contacts 14a and 16a of the reeds 14 and 16; that is, in the vicinity of the center of the casing 12. When the contacts 14a and 16a of the reeds 14 and 16 are opened, a glow discharge occurs in the vicinity of the openings 18 and 20.

In this embodiment, a catalyst 41 is carried on outer periphery of the casing 12. The catalyst 41 is located on the casing 12 including the openings 18 and 20. The catalyst 41 is wound around the casing 12 in the form of a coil spring or as rings. This structure makes it possible to arrange the catalyst 41 in a wide area including the area in which a glow discharge occurs. This results in an improved gas purification efficiency. Needless to say, the catalyst can be attached to the contacts 14a and 16a of the reeds 14 and 16.

Figure 12:
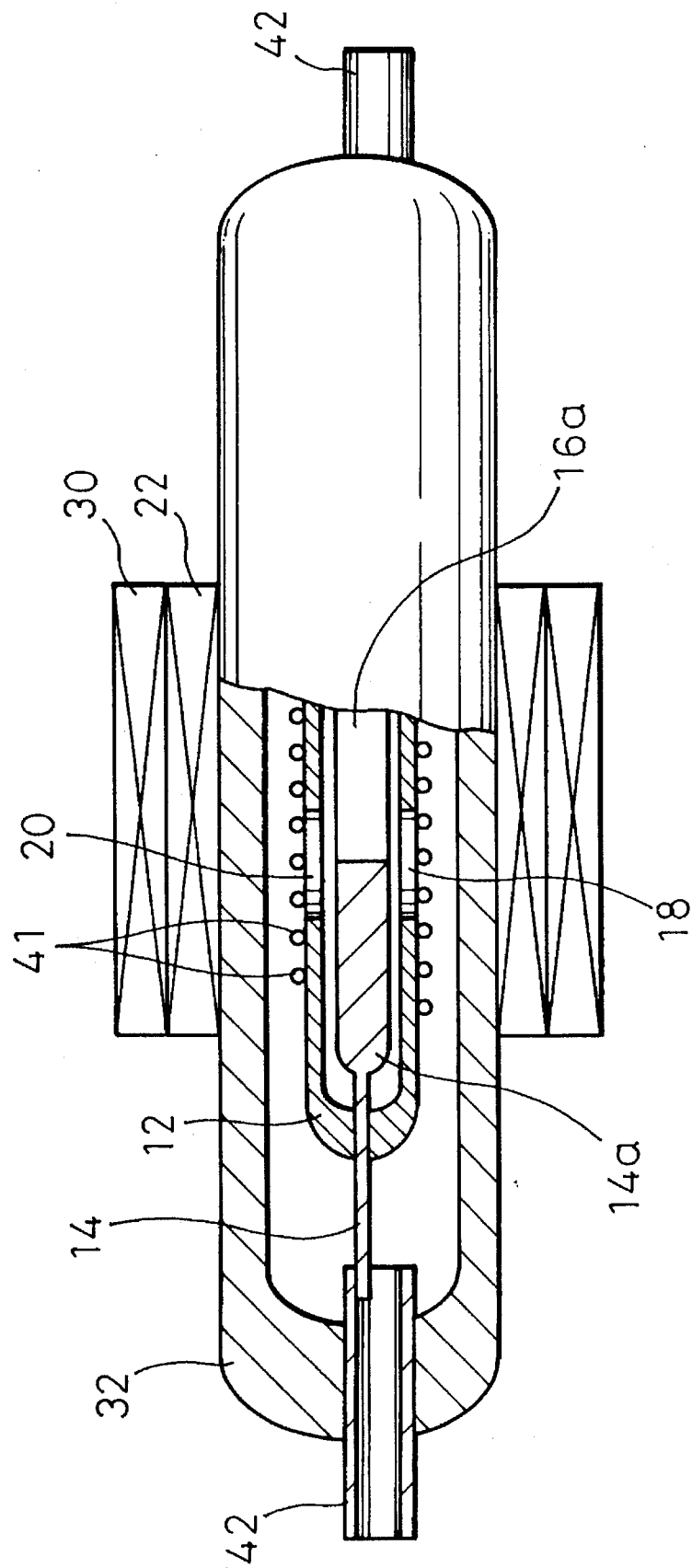
FIG. 12 is a cross-sectional view illustrating the seventh embodiment of the present invention.

FIG. 12 shows the seventh embodiment of the present invention. In this embodiment, similarly to the embodiment of FIG. 11, the casing 12 having reeds 14 and 16 is accommodated in the outer housing 32. The casing 12 has openings 18 and 20 in the vicinity of the contacts 14a and 16a of the reeds 14 and 16; that is, in the vicinity of the center of the casing 12. A catalyst 41 is carried by the casing 12 on the outer periphery thereof. In this embodiment, the reeds 14 and 16 are supported by terminal members 42 having a hollow structure. The hollow terminal members 42 have openings inside the outer housing 32, which serve the gas inlet and outlet 34 and 36, respectively. This structure simplifies machining of the outer housing 32.

Figure 13:
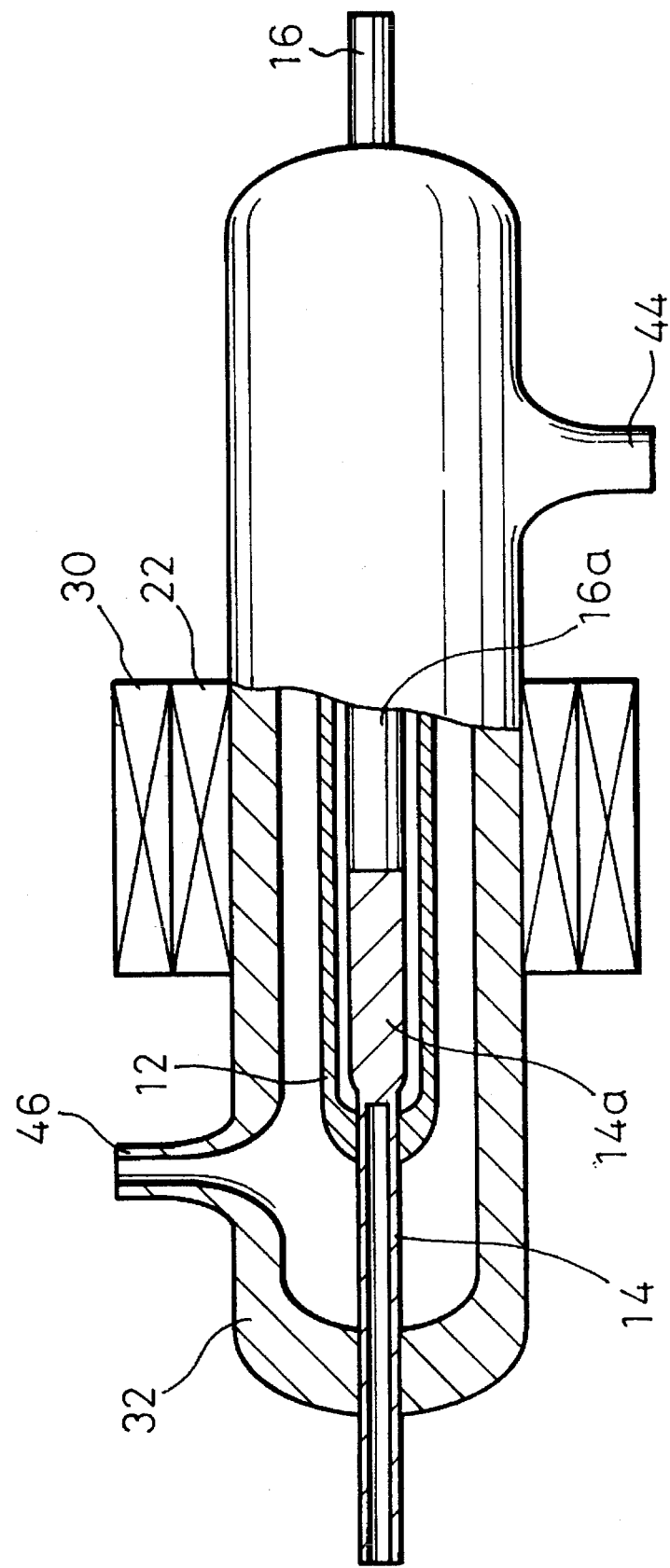
FIG. 13 is a cross-sectional view illustrating the eighth embodiment of the present invention.

FIG. 13 shows the eighth embodiment of the present invention. In this embodiment, the casing 12 having reeds 14 and 16 is accommodated in the outer housing 32. A catalyst (not shown) is carried by the contacts 14a and 16a of the reeds 14 and 16. It is also possible to arrange the catalyst on the circumference of the casing 12, similarly to the previous embodiment. In this embodiment, the reeds 14 and 16 themselves have a hollow structure and provide openings 18 and 20 for the casing 12. The contacts 14a and 16a or the distal parts of the reeds 14 and 16 are flat, respectively, so that they can flexibly deform to perform switching action. The reeds 14 and 16 extend to the outside of the outer housing 32 with its entire hollow structure. Therefore, the reeds 14 and 16 also provide the aforesaid gas inlet and outlet 34 and 36. Two openings 44 and 46 in the outer housing 32 are designed to cool the outer housing 32.

Figure 14:
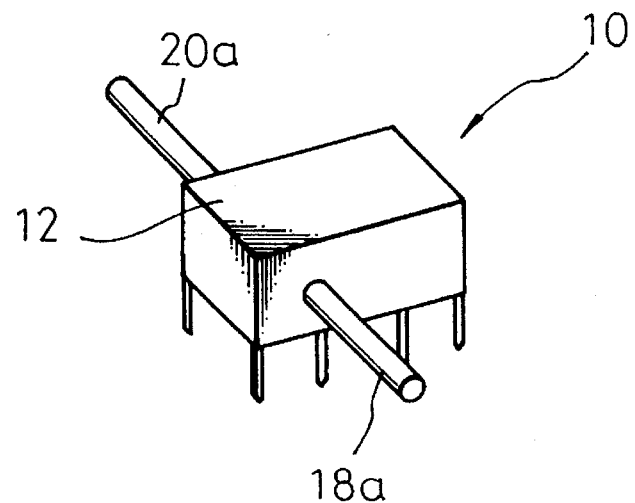
FIG. 14 is a cross-sectional view illustrating the ninth embodiment of the present invention.
Figure 15:
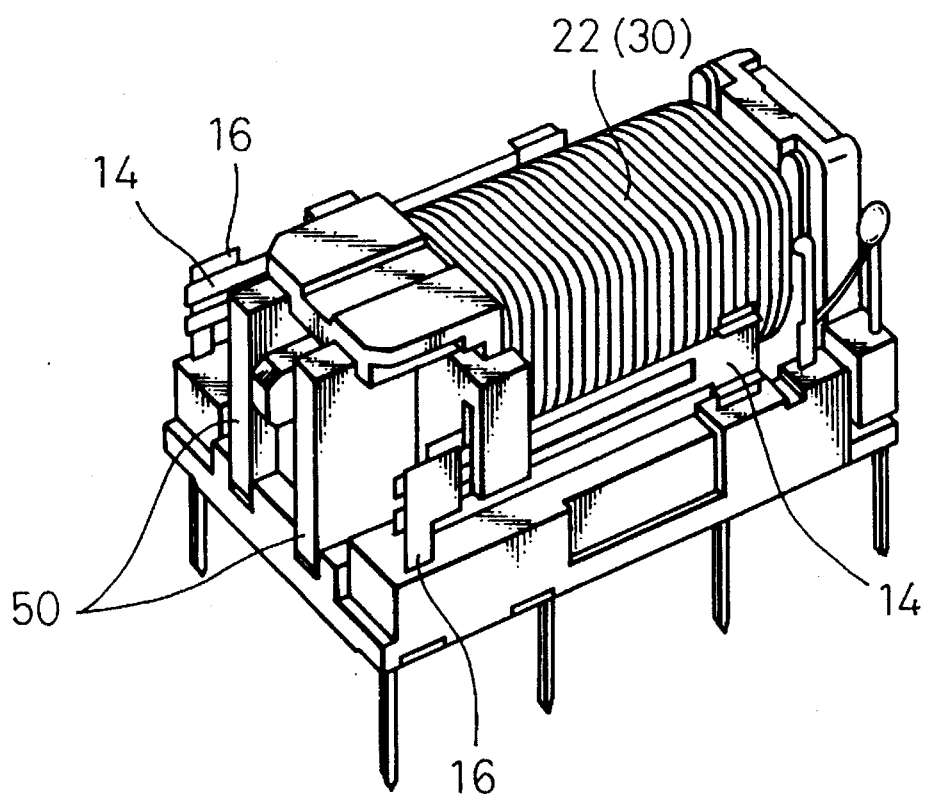
FIG. 15 is a view illustrating the inside of the embodiment illustrated in FIG. 14.

FIGS. 14 and 15 show the ninth embodiment of the present invention. This embodiment is based on the principle shown in FIG. 1 and employs an application of a relay. As shown in FIG. 14, a gas purifier 10 includes a casing 12 having pipes 18a and 20a forming two openings. FIG. 15 shows the casing 12 with the upper part thereof removed. The gas purifier 10 includes movable contact reeds 14 and stationary reeds 16. At least one pair of the contacts of the movable contact reeds 14 and stationary reeds 16 are provided with a catalyst (not shown) made of a platinum group.

The gas purifier 10 further includes a driving coil 22 that causes one pair of the contacts of the reeds 14 and 16 to open and close, and a contact load coil 30 connected to one pair of the reeds 14 and 16, wherein the driving coil 22 and contact load coil 30 are wound in a double layered manner. The driving coil 22 applies magnetic attraction to pole pieces 50 located near the contacts of the movable contact reeds 14, which causes the movable contact reeds 14 to open from the stationary reeds 16. The gas purifier 10 has the same basic components as one in FIG. 1, and can achieve a gas purification based on the action of the plasma and the action of the catalyst.

Figure 16:
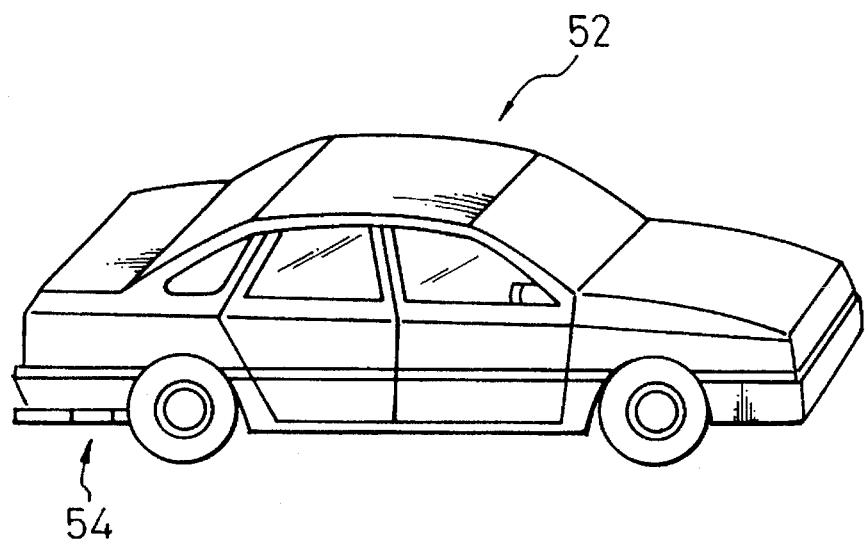
FIG. 16 is a view illustrating an automobile having an exhaust gas purification device.
Figure 17:
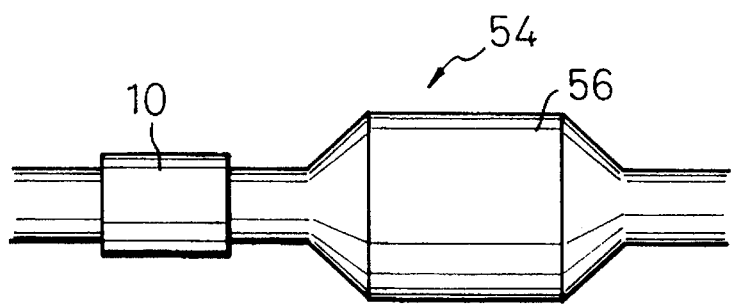
FIG. 17 is a view illustrating the tenth embodiment of the present invention installed in the exhaust system of FIG. 16.

FIGS. 16 and 17 show the tenth embodiment of the present invention. As shown in FIG. 16, an exhaust emission control device 54 is mounted in an exhaust system of an automobile 52.

As shown in FIG. 17, the exhaust emission control device 54 comprises a gas purifier 10, corresponding to that described with reference to FIG. 1 and other Figures, in series with a conventional catalytic exhaust gas purifier 56 for an automobile. The conventional catalytic exhaust gas purifier 56 includes a three-way catalyst which is carried by a carrier in the form of pellets or a porous supporting member.

In a preferred mode, the gas purifier 10 is activated only when the automobile is started up, that is, the driving coil 22 is energized.

Figure 18:
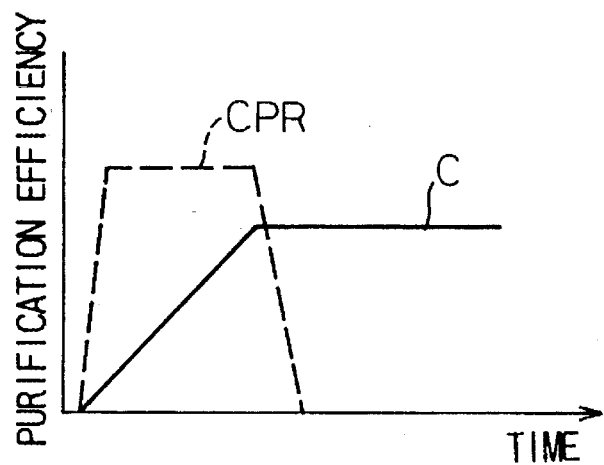
FIG. 18 is an explanatory diagram illustrating the operation of the embodiment of FIG. 17.

In FIG. 18, the gas purifier 10 works effectively soon after the automobile is started up, as indicated by the broken line CPR. In contrast, the conventional catalytic exhaust gas purifier 56 becomes effective after the temperature of the engine rises to a certain level, as indicated by the solid line C. Therefore, according to the arrangement in FIG. 17, the exhaust gas purification is achieved immediately after the engine is started up.

Figure 19:
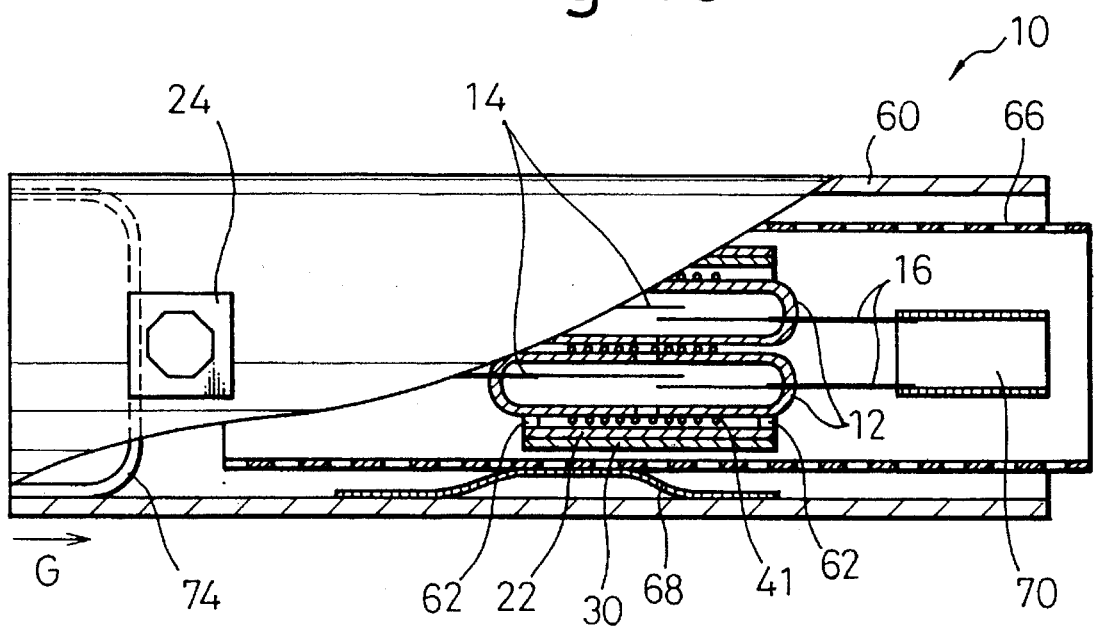
FIG. 19 is a cross-sectional view illustrating the eleventh embodiment of the present invention.
Figure 20:
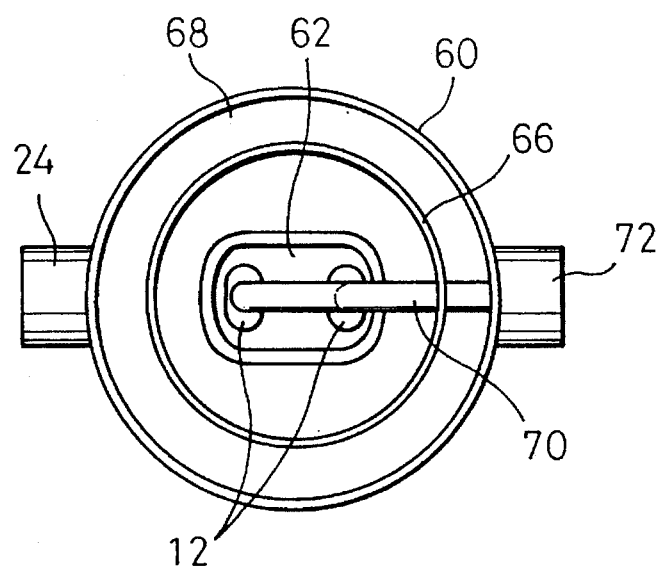
FIG. 20 is a right-hand end view of FIG. 19.

FIGS. 19 and 20 show the eleventh embodiment of the present invention. A gas purifier 10 is suitable for the exhaust emission control device 54 in FIG. 17.

In FIGS. 19 and 20, the gas purifier 10 includes an outer metallic tube 60. A plurality of casings 12 each having a pair of reeds 14 and 16 and carrying a catalyst therein are united with a spacer 62 lying between and around them and accommodated in the outer metallic tube 60. A catalyst 41 is attached to the outer circumference of each casing 12. A driving coil 22 and a contact load coil 33 are wound around the casings 12.

A pulse generator 24 is mounted to the outer circumference of the outer metallic tube 60. A porous cylinder 66, which is plated with a precious metal, is located inside the outer metallic tube 60. The porous cylinder 66 is fixed to the outer metallic tube 60 by means of a support spring 68. The casings 12 are located inside the porous cylinder 66. Terminal coupling members 70, which are coated with an insulating material and serve as the common supporting members 38 and terminal members 40 in FIG. 5, penetrate from the outer metallic tube 60 through the porous cylinder 66. The two terminal coupling members 70 are separated from each other in the axial direction, and connected to the reeds 14 and 16, respectively. Owing to the terminal coupling members 70, the casings 12 including the reeds 14 and 16 are fixed to the outer metallic tube 60. The outer ends of the terminal coupling members 70 are connected to an electrical apparatus 72.

A mesh member 74 which is plated with a precious metal is located in front of the casings 12 in the outer metallic tube 60. The arrow G indicates the direction of the flow of gas. The mesh member 74 is arranged so that its recessed surface faces the source of the gas flow. A flange for coupling the gas purifier to an exhaust pipe is omitted from the drawings. Thus, a new gas purifier for an automobile can be obtained.

In the aforesaid embodiments, the magnetically sensitive reeds 14 and 16 are connected to the DC power supply, and glow discharge is induced by the back electromotive force "e" generated by the inductance L of the contact load coil 30. According to the present invention, glow discharge can be further induced, using alternating current. Alternating current drive will be described below.

Figure 21:
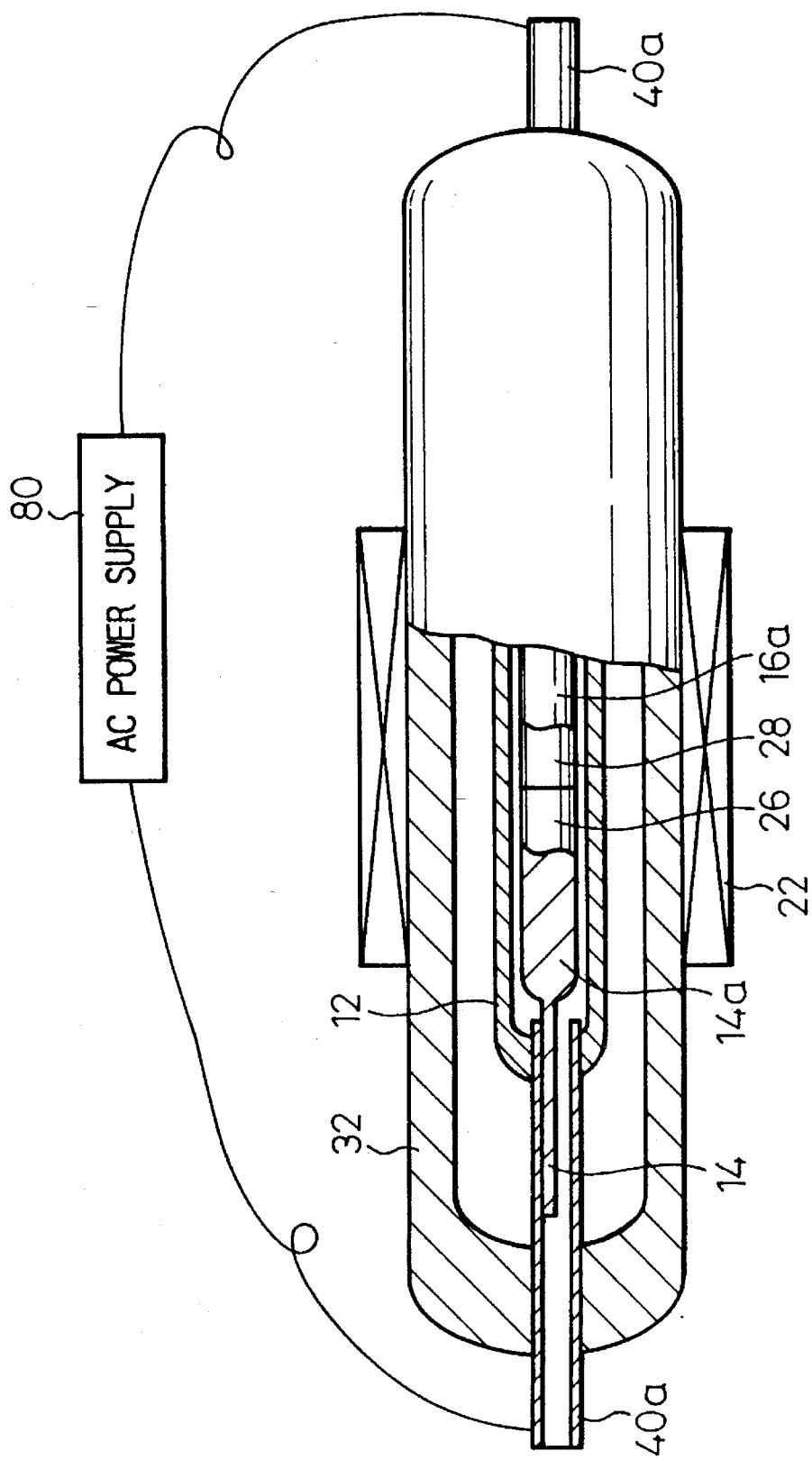
FIG. 21 is a cross-sectional view illustrating the twelfth embodiment of the present invention.

FIG. 21 shows the twelfth embodiment of the present invention. A gas purifier 10 of this embodiment includes an AC power supply 80 but does not include a contact load coil 30. Except for this point, the gas purifier 10 of this embodiment has almost the same component members as those of FIGS. 1 to 8.

To be more specific, the gas purifier 10 comprises magnetically sensitive reeds 14 and 16 inserted into a casing 12. The contacts 14a and 16a of the reeds 14 and 16 are provided with catalyst layers 26 and 28. A plurality of casings 12 are accommodated in an outer housing 32. The magnetically sensitive reeds 14 and 16 extend to the outside of the outer housing 32 via terminal members 40a. The terminal members 40 are hollow, thus serving as the hollow reeds 14 and 16 in FIG. 13 and providing the openings 18 and 20 for the casings 12 and the gas inlets and outlets 34 and 36 for the outer housing 32. A driving coil 22 is wound around the outer circumference of the outer housing 32. Therefore, it is possible to construct so that the embodiments shown in FIGS. 1 to 20 can be driven by alternating current, if the contact load coil 30 therein is omitted. Also, it is possible to construct the gas purifier 10 so that the embodiments in FIG. 21 and the following embodiments can be driven by direct current if the contact load coil 30 is provided.

In FIG. 21, the magnetically sensitive reeds 14 and 16 are connected to the AC power supply 80. It has been found that glow discharge can be induced without any contact load coil 30, since the AC power supply 80 has an impedance.

Figure 22:
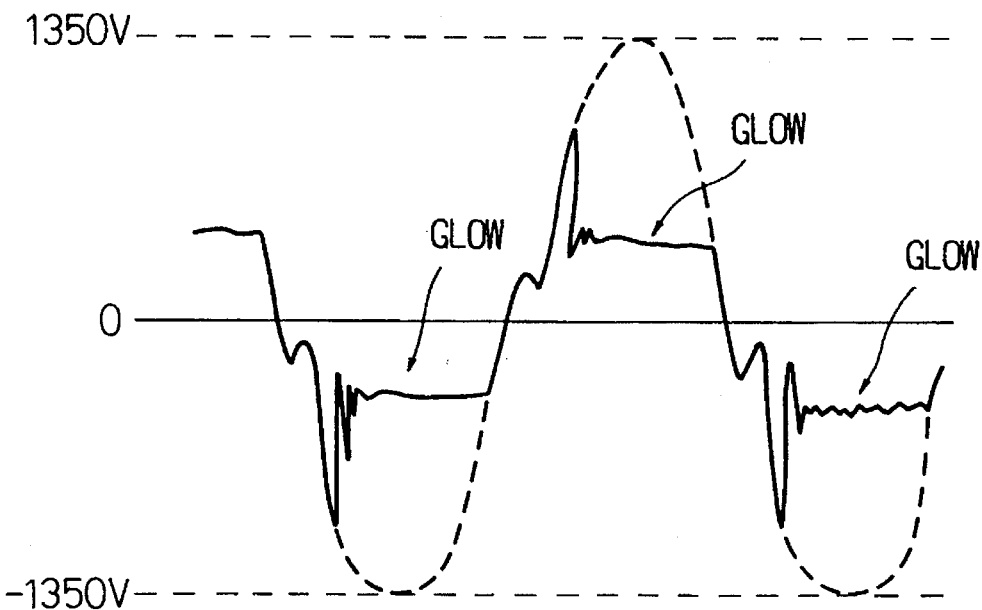
FIG. 22 is a view illustrating glow discharge induced by an AC drive circuit of the embodiment of FIG. 21.

FIG. 22 shows the glow discharge caused by AC drive. In this case, the AC power supply 80 generates a peak-to-peak voltage of 700 V at 30 kHz. First, the driving coil 22 is supplied with voltage, and the contacts 14a and 16a of the reeds 14 and 16 are closed with the result that current flows between the contacts 14 and 16. The power supply to the driving coil 22 is then turned off, the contacts 14a and 16a are opened, with the result that glow discharge is induced, as described previously.

Once glow discharge is induced, that glow discharge fires the following glow discharge when the absolute value of the applied AC voltage becomes a specified discharge voltage value. The gap between the contacts 14a and 16a of the reeds 14 and 16 is so small that the discharge starting voltage may be, for example, approximately 200 V. The discharge starting voltage varies depending on the type and concentration of the flowing gas. If glow discharge can be started by an AC power supply only, the driving coil 22 may be omitted. The glow discharges occur continuously, and it is conceived that the contacts 14a and 16a of the reeds 14 and 16 are substantially not moved and held with a certain minute gap between them.

Figure 23:
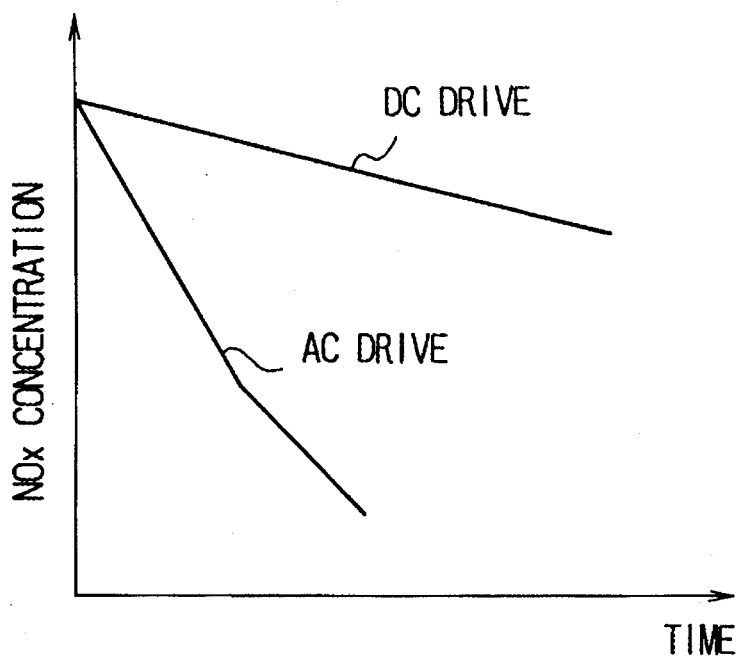
FIG. 23 is a graph illustrating the gas purification efficiency of the purifier of the present invention having the DC drive and the AC drive.

FIG. 23 shows the efficiency of gas purification represented by NOx concentration of the DC drive and of the AC drive. The lower the NOx concentration, the higher the gas purification efficiency. As apparent from this graph, the efficiency of gas purification using the AC drive is considerably superior to the DC drive. This is because when the DC drive is employed, the glow duration time tg is actually very short, as described with reference to FIG. 3. In the DC drive, glow discharge occurs once every time when the driving coil 22 is cut off, and the operating frequency of the driving coil 22 cannot be set to a large value. When the AC drive is employed, however, glow discharges occur twice for every AC cycle, and a high frequency can be used easily. Therefore, it can be said that the glow discharges occur substantially continuously in FIG. 22. If glow discharges occur continuously, it is naturally possible to obtain an excellent gas purification efficiency.

In the AC drive, alternating current with a frequency in the range from 50 Hz to 120 kHz can be used. Herein, the preferable frequency range is from 10 kHz to 50 kHz.

Figure 24:
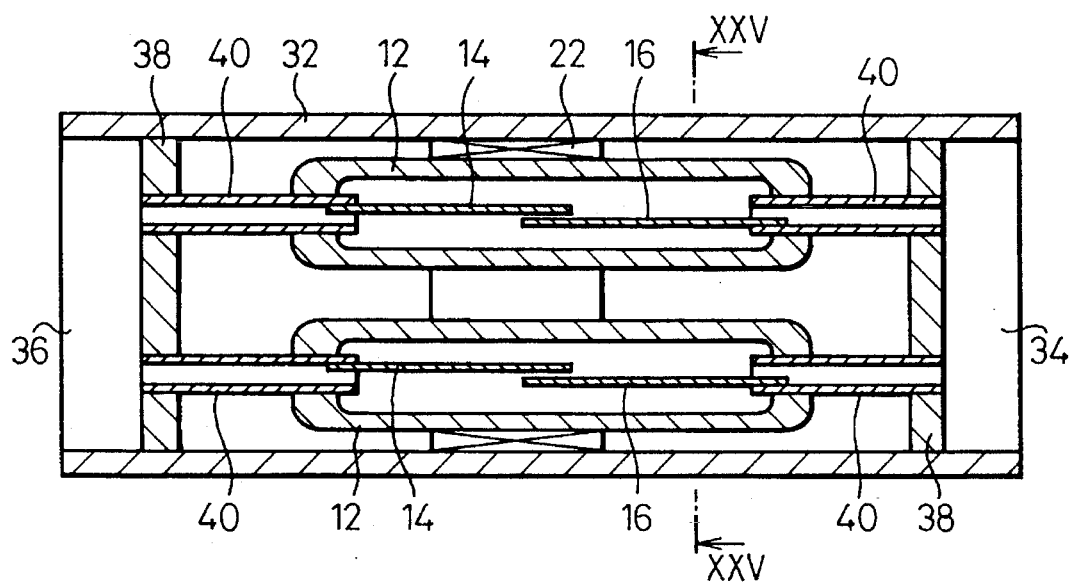
FIG. 24 is a cross-sectional view illustrating the thirteenth embodiment of the present invention.
Figure 25:
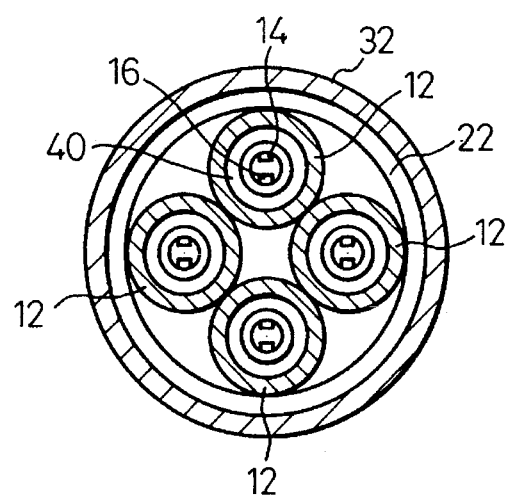
FIG. 25 is a cross-sectional view along the line XXV—XXV of FIG. 24.

FIGS. 24 and 25 show the thirteenth embodiment of the present invention. A gas purifier 10 comprises magnetically sensitive reeds 14 and 16 inserted into a casing 12. The contacts of the magnetically sensitive reeds 14 and 16 are provided with catalyst layers (not shown). In this embodiment, the four casings 12 are accommodated in a tubular outer housing 32. The magnetically sensitive reeds 14 and 16 are connected to hollow terminal members 40. The terminal members 40 are fixed to common supporting members 38. The common supporting members 38 are connected to a power supply which is not shown. The outer housing 32 has a gas inlet 34 and an outlet 36. A driving coil 22 is wound around the four casings 12 in the outer housing 32. The four casings 12 and driving coil 22 are located in a space sealed with the common supporting members 38, so that they will not be contaminated by the gas to be purified. The operation of this embodiment is identical to that of the previous embodiment.

Figure 26:
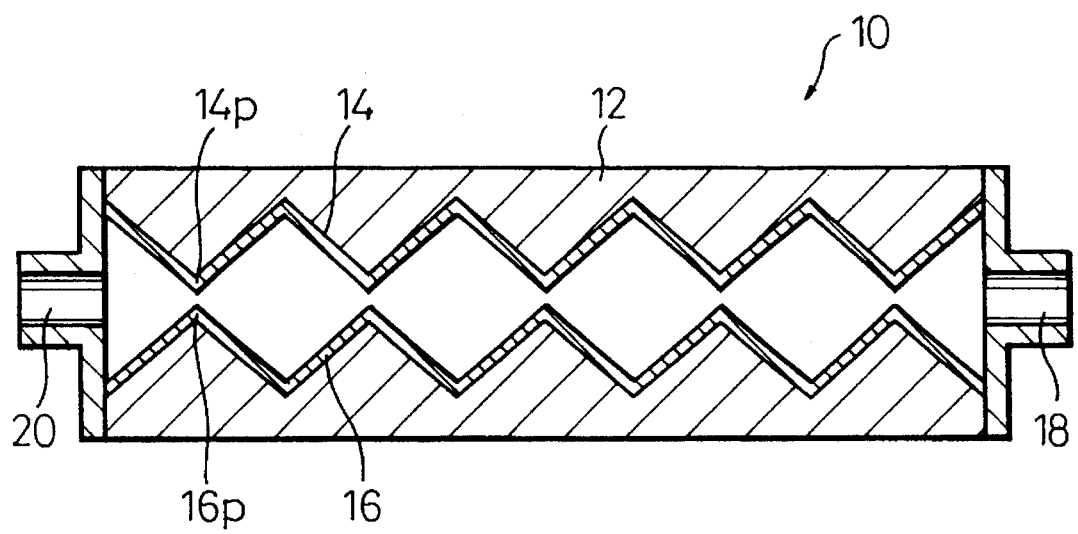
FIG. 26 is a cross-sectional view illustrating the fourteenth embodiment of the present invention.

FIG. 26 shows the fourteenth embodiment of the present invention. A gas purifier 10 comprises a pair of opposing electrode films 14 and 16 inserted in a casing 12. The casing 12 has two openings 18 and 20 serving as a gas inlet and an outlet. The electrode films 14 and 16 are connected to an AC power supply (not shown). In this embodiment, the electrode films 14 and 16 are shaped in a wavy form. Each pair of crests 14p and 16p of the wave are opposed each other with a minute gap between them. Glow discharge occurs in the minute gap. Also, the electrode films 14 and 16 are formed from catalyst layers made of rhodium. The electrode films 14 and 16 are made by vapor deposition or sputtering of rhodium onto the inner wall of the casing 12. Needless to say, rhodium may be replaced by any of the aforesaid catalytic metals. In this way, the electrode films 14 and 16 are wide electrodes extending substantially between two openings 18 and 20.

Figure 27:
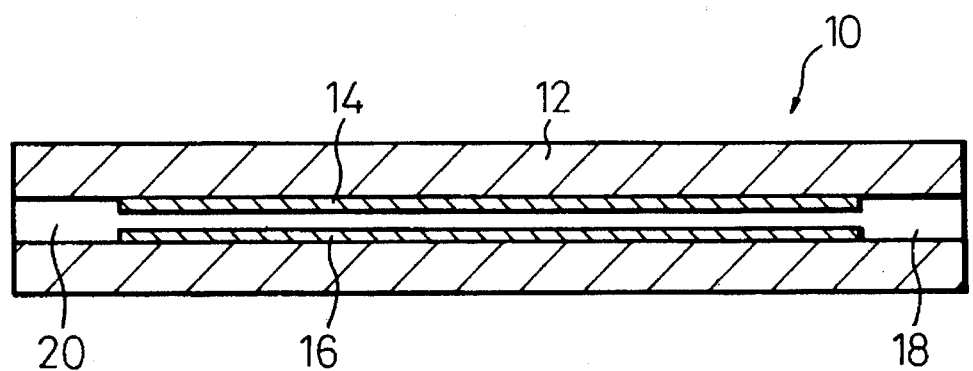
FIG. 27 is a cross-sectional view illustrating the fifteenth embodiment of the present invention.

FIG. 27 shows the fifteenth embodiment of the present invention. A gas purifier 10 comprises a pair of opposing electrode films 14 and 16 inserted in a casing 12. The casing 12 has two openings 18 and 20 serving as a gas inlet and an outlet. The electrode films 14 and 16 are connected to an AC power supply (not shown). In this embodiment, the electrode films 14 and 16 are shaped like flat plates and separated from each other with a minute gap between them. Glow discharge occurs in the minute gap. In this case too, the electrode films 14 and 16 are made by vapor deposition or sputtering of rhodium.

Figure 28:
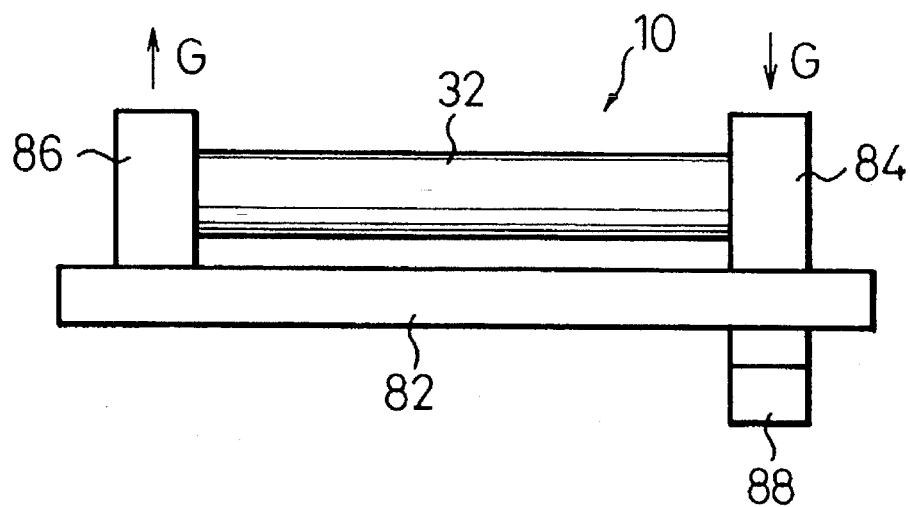
FIG. 28 is a diagrammatic view illustrating the sixteenth embodiment of the present invention.
Figure 29:
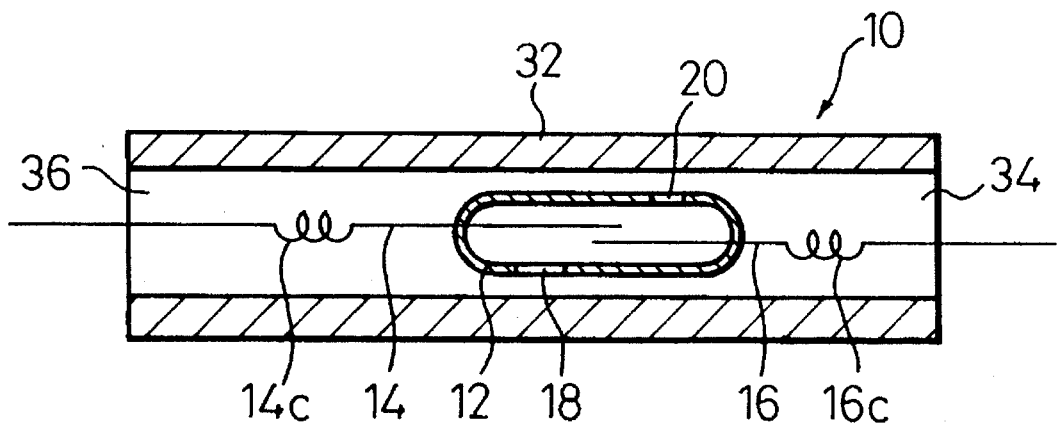
FIG. 29 is an enlarged cross-sectional view of the gas purifier of FIG. 28.

FIGS. 28 and 29 show the sixteenth embodiment of the present invention. A gas purifier 10 has, similarly to that shown in FIG. 5, a casing 12 accommodated in an outer housing 32. The casing 12 includes a pair of opposing magnetically sensitive reeds 14 and 16, and has two openings 18 and 20 serving as a gas inlet and an outlet. Both ends of the outer housing 32 open to form an inlet 34 and an outlet 36.

As shown in FIG. 28, the gas purifier 10 is placed between two tubular supports 84 and 86 mounted to the top of an insulating supporting member 82. The tubular supports 84 and 86 are connected to the inlet 34 and the outlet 36 at both ends of the outer housing 32. Gas flows, for example, from the right hand tubular support 84 through the outer housing 32 and the casing 12 therein, and goes out of the left hand tubular support 86. Each of the tubular supports 84 and 86 has means for securing the magnetically sensitive reeds 14 and 16 and means for connecting the magnetically sensitive reeds 14 and 16 to a power supply (not shown). A flow rate control button 88 is formed on the bottom of the insulating supporting member 82. A flow rate control means (not shown) coupled with the flow rate control button 88 controls the flow rate of gas flowing from the right hand support 84 through the outer housing 32. The magnetically sensitive reeds 14 and 16 include coil portions 14c and 16c which support the casings 12 elastically. Needless to say, the magnetically sensitive reeds 14 and 16 are provided with a catalyst.

Figure 30:
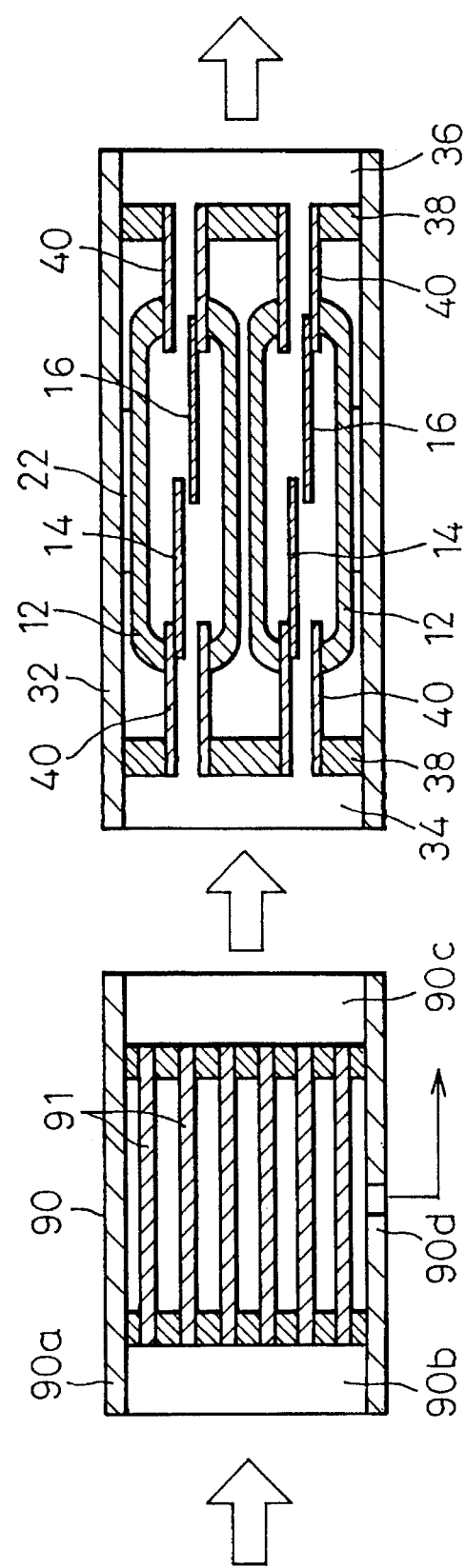
FIG. 30 is a cross-sectional view illustrating the seventeenth embodiment of the present invention.

FIG. 30 shows the seventeenth embodiment of the present invention. The aforesaid gas purifiers of the embodiments can purify pollutive gases such as COx, CmHn, NOx, and SOx efficiently. In recent years, it has been especially demanded to purify NOx in exhaust gas of an automobile. NOx reacts, as mentioned above, according to the following formula and is changed to harmless $N_2$.

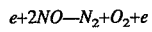

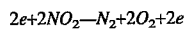

The inventors have considered a method by which NOx can be further efficiently removed and founded that the presence of an oxygen component in exhaust gas of an automobile triggers the reverse reaction regarding the above described formula and eventually deteriorates a NOx purification efficiency. To clear this obstacle, the oxygen component in exhaust gas of an automobile is isolated and a portion of the gas containing mainly a NOx component flows through the gas purifier of the aforesaid embodiments.

This method guarantees more efficient purification of NOx. The description below proceeds on the assumption that gas to be purified is NOx. The contents of the description are also true for COx, CmHn, and SOx.

In FIG. 30, a gas separating membrane module 90 serving as a gas separator means is arranged upstream of the aforesaid gas purifier of the present invention. In FIG. 30, the gas separating membrane module 90 is combined with the embodiment shown in FIG. 24. Needless to say, the separating membrane module 90 can be used in combination with any of the aforesaid embodiments.

In FIG. 30, the gas separating membrane module 90 includes gas separating membranes 91. The gas separating membranes 91 are arranged in an outer cylinder 90a. The outer cylinder 90a has a gas inlet 90b, a first gas outlet 90c, and a second gas outlet 90d. The gas separating membranes 91 are made of any high polymer material able to vary the speed of transmitting gases depending on the type of gas. For example, an oxygen enrichment membrane is well known. The gas separating membranes 91 in FIG. 30 are of the type referred to as a hollow type. The gas separating membranes 91 and the outer cylinder 90a are united as a module which has been marketed by, for example, US Permea Inc. and Daido Oxygen Co., Ltd. in Japan.

Mixed gases enter the gas separating membrane module 90 via the gas inlet 90b. The gas isolated by the gas separating membranes 91 and containing mainly an NOx component, goes out of the first gas outlet 90c, and flows into the inlet 34 of the outer housing 32 of the gas purifier. The gas purifier efficiently purifies the gas which contains a little amount of oxygen and a large amount of pollutive components to be purified, owing to the synergical action of plasma and catalyst. The gas isolated by the gas separating membranes 91 containing mainly oxygen goes out of the second outlet 90d, bypassing the outer housing 32 of the gas purifier to the exhaust tube (not shown) downstream of the outer housing 32.

Figure 31:
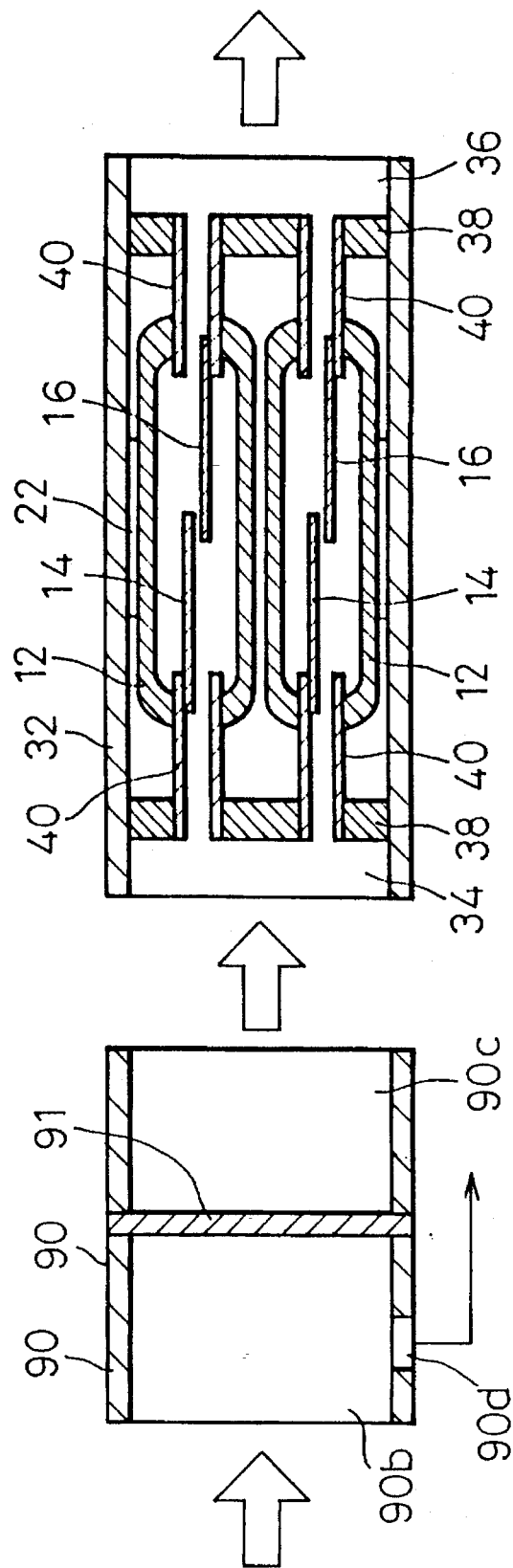
FIG. 31 is a view illustrating a variant of the embodiment of FIG. 30.

FIG. 31 shows a variant of the embodiment of FIG. 30. In this variant, a gas separating membrane module 90 includes a gas separating membrane 91. The gas separating membrane 91 is arranged in an outer cylinder 90a. The outer cylinder 90a has a gas inlet 90b, a first gas outlet 90c, and a second gas outlet 90d. The gas selective separating membrane 91 is made of any high polymer material able to vary the speed of transmitting gases depending on the type of gas. For example, an oxygen enrichment membrane is well known. The gas separating membrane 91 in FIG. 31 is of a flat plate type. In the gas separating membrane module 90 in FIG. 31, similarly to the gas separating membrane module 90 in FIG. 30, mixed gases enter the gas separating membrane module 90 via the gas inlet 90b. The gas isolated by the gas separating membrane 91 which contains mainly an NOx component goes out of the first gas outlet 90c, and flows into the inlet 34 of the outer housing 32 of the gas purifier. The gas isolated by the gas selective separating membrane 91 which contains mainly oxygen goes out of the second gas outlet 90d. The gas purifier purifies the gas, which comes out of the first gas outlet 90c and contains little oxygen and a large amount of pollutive components to be purified, owing to the synergical action of plasma and catalyst.

As described, the present invention provides a gas purifier that is relatively compact and can induce glow discharge at relatively low voltage, and by which the action of a plasma and the action of a catalyst are synergically combined. Therefore, it is possible to provide a gas purifier that can treat various gases.

We claim:

1. A gas purifier comprising:

a casing having at least two openings allowing gas to flow through said casing;

at least one pair of opposing electrodes arranged in said casing, each pair of opposing electrodes having a respective pair of substantially parallel opposing surfaces with a gap therebetween, the opposing surfaces being formed from a catalyst comprising a transition metal; and an A C power supply for inducing glow discharge on said at least one pair of opposing electrodes.

2. A gas purifier according to claim 1, wherein said at least one pair of electrodes comprise magnetically sensitive reeds having opposing contacts.

3. A gas purifier according to claim 2, further comprising a driving coil for opening and closing said contacts of said at least one pair of reeds.

4. A gas purifier according to claim 1, wherein said at least one pair of electrodes comprise wide electrode films substantially extending between said at least two openings.

5. A gas purifier according to claim 1, wherein said catalyst comprises a precious metal.

6. A gas purifier according to claim 1, further comprising an outer housing having a gas inlet and a gas outlet, said outer housing accommodating at least one casing having said at least one pair of electrodes.

7. A gas purifier according to claim 1, further comprising a gas separator means arranged on an upstream side of said casing having said at least two openings, said at least one pair of opposing electrodes, and said catalyst for selectively separating a gas to be purified from a gas flowing through said casing.

8. A gas purifier according to claim 7, further comprising at least one outer housing having a gas inlet and a gas outlet, said outer housing accommodating at least one casing having said at least one pair of electrodes, said gas separator means arranged on an upstream side of said outer housing.

9. A gas purifier according to claim 8, wherein said gas separator means includes a gas separating membrane.

10. A gas purifier according to claim 9, wherein said gas separating membrane mainly separates oxygen from nitrogen compounds and the separated nitrogen compound is introduced into said casing.

* * * * *